US012747781B1

(12) United States Patent
Johnson

(10) Patent No.: US 12,747,781 B1
(45) Date of Patent: Sep. 29, 2026

(54) MATING POWDER METAL GEAR TO SHAFT

(71) Applicant: Schaeffler Technologies AG & Co. KG, Herzogenaurach (DE)

(72) Inventor: Joseph Johnson, Midland, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/241,017

(22) Filed: Jun. 17, 2025

(51) Int. Cl.

| | |
|---|---|
| ***F16H 57/00*** | (2012.01) |
| ***B23P 19/02*** | (2006.01) |
| ***F16D 7/02*** | (2006.01) |
| ***H02K 7/00*** | (2006.01) |
| ***H02K 7/08*** | (2006.01) |
| ***H02K 7/116*** | (2006.01) |

(52) U.S. Cl.
CPC .......... *F16H 57/0025* (2013.01); *B23P 19/02* (2013.01); *F16D 7/021* (2013.01); *H02K 7/003* (2013.01); *H02K 7/085* (2013.01); *H02K 7/116* (2013.01); *F16D 2200/0008* (2013.01); *F16D 2200/0021* (2013.01); *F16D 2250/0084* (2013.01)

(58) Field of Classification Search
CPC ...... F16H 57/0025; B23P 19/02; F16D 7/021; F16D 2200/0008; F16D 2200/0021; F16D 2250/0084; H03K 7/003; H03K 7/085; H03K 7/116
USPC ........................................................ 403/359.6
See application file for complete search history.

(56) References Cited

U.S. PATENT DOCUMENTS

| | | | | |
|---|---|---|---|---|
| 11,701,744 | B2 | 7/2023 | Kronberger et al. | |
| 2007/0107197 | A1 | 5/2007 | Perrow et al. | |
| 2026/0084255 | A1 * | 3/2026 | Puchele | B23Q 11/04 |

FOREIGN PATENT DOCUMENTS

| | | | | | |
|---|---|---|---|---|---|
| CN | 104047966 | A | | 9/2014 | |
| CN | 105313950 | A | * | 2/2016 | F16D 1/0858 |
| CN | 106567918 | A | * | 4/2017 | F16H 57/0025 |
| CN | 110050136 | A | * | 7/2019 | F16H 55/22 |
| DE | 4302726 | A1 | | 8/1993 | |
| EP | 1793136 | A1 | | 6/2007 | |
| EP | 4350161 | A1 | * | 4/2024 | F16D 7/028 |
| GB | 2283076 | A | * | 4/1995 | F16D 1/116 |
| JP | 2001271903 | A | * | 10/2001 | E01H 5/09 |
| JP | 2008178161 | A | * | 7/2008 | |
| KR | 830001460 | B1 | * | 7/1983 | B21D 39/00 |
| WO | 2004016962 | A1 | | 2/2004 | |
| WO | 2020164985 | A1 | | 8/2020 | |

* cited by examiner

*Primary Examiner* — William C Joyce
(74) *Attorney, Agent, or Firm* — Suiter Swantz IP

(57) ABSTRACT

A gear-and-shaft assembly may mate a powder metal gear to an external spline of a shaft using an interference fit between the gear and the external spline. The gear may be sintered hardened to be harder than the external spline, such that the external spline is deformed by the interference fit without deforming or cutting the gear. A dynamo-electric machine may include the gear-and-shaft assembly and a rotor. A method may include pressing the gear onto the shaft.

20 Claims, 15 Drawing Sheets

100

100

102

104

200

MATING POWDER METAL GEAR TO SHAFT

TECHNICAL FIELD

The present disclosure generally relates to attachments of members on a shaft-end, and more particularly, to non-disconnectable attachments involving deformation.

BACKGROUND

Steel shafts may be mated to sintered metal gears, where the torque transmission requirement exceeds what can be met with a traditional press fit. To reach the necessary torque transmission for small gears, the necessary pressure at the interface between the shaft and gear would exceed what the gear could handle without possible gear root failure (cracking). Mating small powdered metal gears to shafts can be especially challenging due to the material properties and general quality control of sinter hardened powder metal gears. Powdered metal gears may be difficult to weld due to the intrinsic material properties of the powdered metal. Oil in the powdered metal gear may leak during welding, making the welds unstable.

SUMMARY

A gear-and-shaft assembly is described, in accordance with one or more embodiments of the present disclosure. The gear-and-shaft assembly may include: a gear, the gear including a gear body, the gear body including an inner-cylindrical surface, the inner-cylindrical surface defining a centered-through hole, the gear being a sintered metal; and a shaft, the shaft including an external spline, the external spline including external teeth, the external teeth being aligned parallel to a center axis of the gear-and-shaft assembly, the external teeth including flanks, a top land, and fillet roots, the flanks adjoining between the top land and the fillet roots, a flank angle being an angle between the flanks of adjacent of the external teeth, the flank angle being between 80 degrees and 100 degrees, a root diameter of the external teeth being between 92% and 98% of an outer diameter of the top land, the gear and the shaft being fit together and configured to rotate together about the center axis, the inner-cylindrical surface and the external spline including an interference fit, the top land abutting the inner-cylindrical surface, the interference fit being between the inner-cylindrical surface and the top land, the external spline being softer than the gear, the interference fit deforming the top land and the flanks, the flanks including deformed sections, the deformed sections adjoining the top land.

In some aspects, the interference fit is non-disconnectable up to a slip torque, wherein the interference fit is maintained after a torque on the shaft is reduced below the slip torque.

In some aspects, the interference fit is one of a locational interference fit, a medium drive fit, or a force fit.

In some aspects, the outer diameter of the top land and an inner diameter of the inner-cylindrical surface include an overlap of between 0.5% and 0.7% of the inner diameter of the inner-cylindrical surface.

In some aspects, the top land and the deformed sections are deformed radially inwards and circumferentially outwards by the interference fit.

In some aspects, the gear is one of a spur gear, a helical gear, a double helical gear, a worm gear.

In some aspects, the external teeth are defined in a polar array about the center axis.

In some aspects, the top land abuts the inner-cylindrical surface for an entirety of an arc length of the top land, wherein the deformed sections do not abut the inner-cylindrical surface, wherein the external teeth are not involute teeth.

In some aspects, the flanks include undeformed sections, wherein the deformed sections adjoin the undeformed sections and the top land, wherein the undeformed sections adjoin the deformed sections and the fillet roots, wherein the flank angle is the angle between the undeformed sections of the flanks of adjacent of the external teeth.

In some aspects, the fillet roots adjoin between adjacent of the flanks.

In some aspects, the root diameter of the external teeth is between 93% and 97% of the outer diameter of the top land.

In some aspects, the flank angle is between 85 degrees and 95 degrees.

In some aspects, the inner-cylindrical surface does not include an internal spline, wherein the gear is not deformed by the interference fit.

In some aspects, the external spline is carbon steel, wherein the carbon steel is one of a low-carbon steel or a medium-carbon steel, wherein the sintered metal is a hardened-ferrous alloy.

In some aspects, the gear body includes a first lead-in surface, wherein the first lead-in surface adjoins to the inner-cylindrical surface, wherein the shaft includes a second lead-in surface, wherein the second lead-in surface adjoins to the external spline, wherein at least one of the first lead-in surface or the second lead-in surface include a chamfer surface, wherein an angle of the chamfer surface is between 10 and 30 degrees.

In some aspects, the shaft includes a shoulder, wherein the gear is radially aligned with, axially offset from, and abuts the shoulder, wherein the shaft includes a rotor-carrier section and a bearing-carrier section, wherein the shoulder is disposed axially between the rotor-carrier section and the external spline, wherein the rotor-carrier section is disposed axially between the shoulder and the bearing-carrier section, wherein the rotor-carrier section is disposed radially outwards of the shoulder and the bearing-carrier section.

A rotating assembly is described, in accordance with one or more embodiments of the present disclosure. The rotating assembly may include: a gear-and-shaft assembly including: a gear, the gear including a gear body, the gear body including an inner-cylindrical surface, the inner-cylindrical surface defining a centered-through hole, the gear being a sintered metal; and a shaft, the shaft including an external spline, the external spline including external teeth, the external teeth being aligned parallel to a center axis of the gear-and-shaft assembly, the external teeth including flanks, a top land, and fillet roots, the flanks adjoining between the top land and the fillet roots, a flank angle being an angle between the flanks of adjacent of the external teeth, the flank angle being between 80 degrees and 100 degrees, a root diameter of the external teeth being between 92% and 98% of an outer diameter of the top land, the gear and the shaft being fit together and configured to rotate together about the center axis, the inner-cylindrical surface and the external spline including an interference fit, the top land abutting the inner-cylindrical surface, the interference fit being between the inner-cylindrical surface and the top land, the external spline being softer than the gear, the interference fit deforming the top land and the flanks, the flanks including deformed sections, the deformed sections adjoining the top land; a rotor; and a radial bearing, the shaft adjoining between the gear, the rotor, and the radial bearing.

In some aspects, the shaft includes a shoulder, wherein the gear is radially aligned with, axially offset from, and abuts the shoulder, wherein the shaft includes a rotor-carrier section and a bearing-carrier section, wherein the shoulder is disposed axially between the rotor-carrier section and the external spline, wherein the rotor-carrier section is disposed axially between the shoulder and the bearing-carrier section, wherein the rotor-carrier section is disposed radially outwards of the shoulder and the bearing-carrier section, wherein the rotor is adjoined to the rotor-carrier section, wherein the radial bearing is adjoined to the bearing-carrier section.

A method is described, in accordance with one or more embodiments of the present disclosure. The method may include: forming a gear, the gear including a gear body, the gear body including an inner-cylindrical surface, the inner-cylindrical surface defining a centered-through hole, the gear being a sintered metal; forming an external spline in a shaft, the external spline including external teeth, the external teeth being aligned parallel to a center axis of a gear-and-shaft assembly, the external teeth including flanks, a top land, and fillet roots, the flanks adjoining between the top land and the fillet roots, a flank angle being an angle between the flanks of adjacent of the external teeth, the flank angle being between 80 degrees and 100 degrees, a root diameter of the external teeth being between 92% and 98% of an outer diameter of the top land; and pressing the gear onto the external spline, the gear and the shaft being fit together and configured to rotate together about the center axis, the inner-cylindrical surface and the external spline including an interference fit, the top land abutting the inner-cylindrical surface, the interference fit being between the inner-cylindrical surface and the top land, the external spline being softer than the gear, the interference fit deforming the top land and the flanks, the flanks including deformed sections, the deformed sections adjoining the top land.

In some aspects, the method may include: rotating the gear and the shaft about the center axis of the gear-and-shaft assembly by a torque applied to the shaft, wherein the torque applied to the shaft is up to a slip torque of the interference fit; slipping the shaft relative to the gear by the torque applied to the shaft being at or above the slip torque of the interference fit; and reducing the torque applied to the shaft below the slip torque such that the gear and the shaft rotate together about the center axis of the gear-and-shaft assembly.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
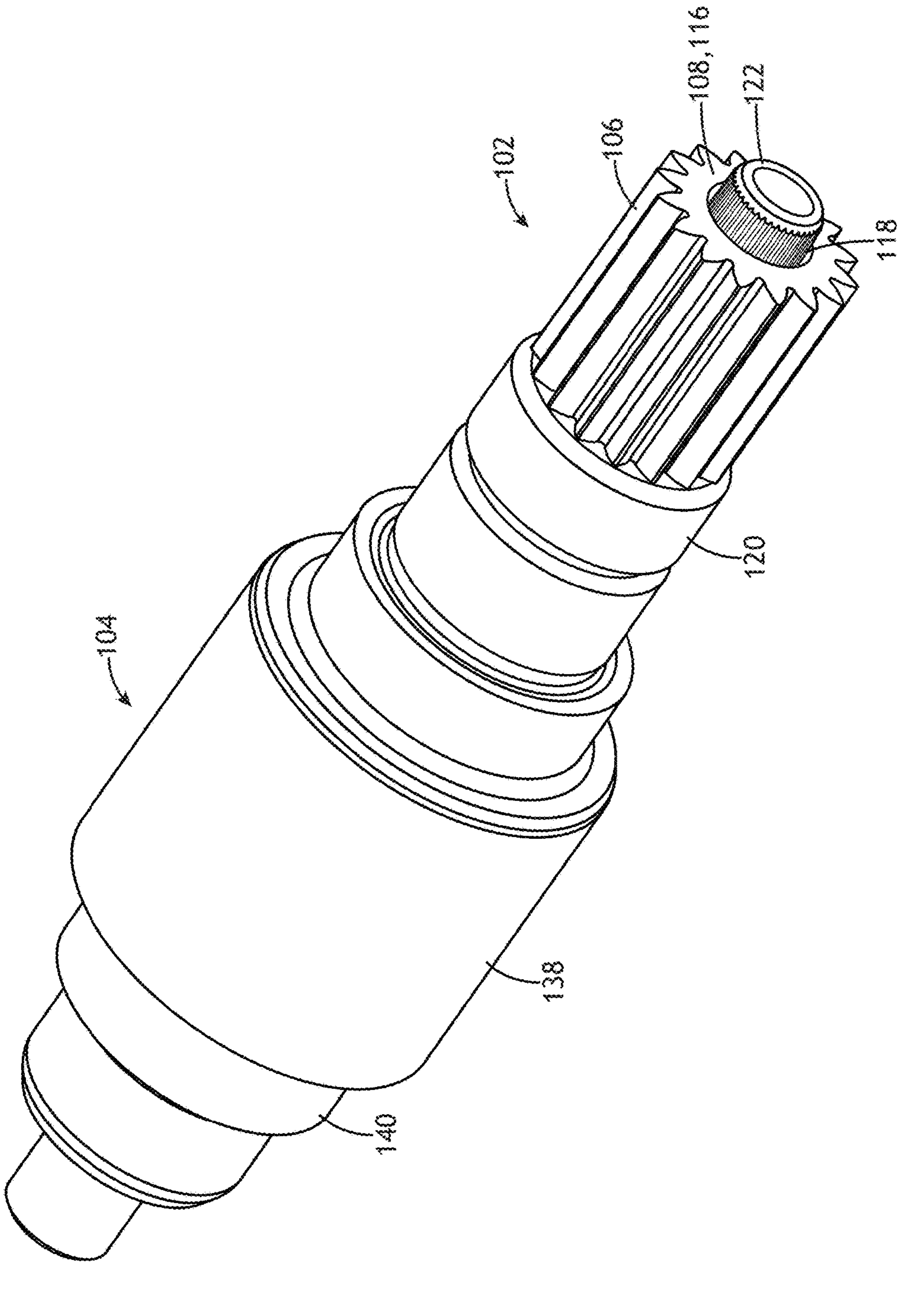
FIG. 1A illustrates a perspective view of a gear-and-shaft assembly with a gear and a shaft, in accordance with one or more embodiments of the present disclosure.
Figure 1B:
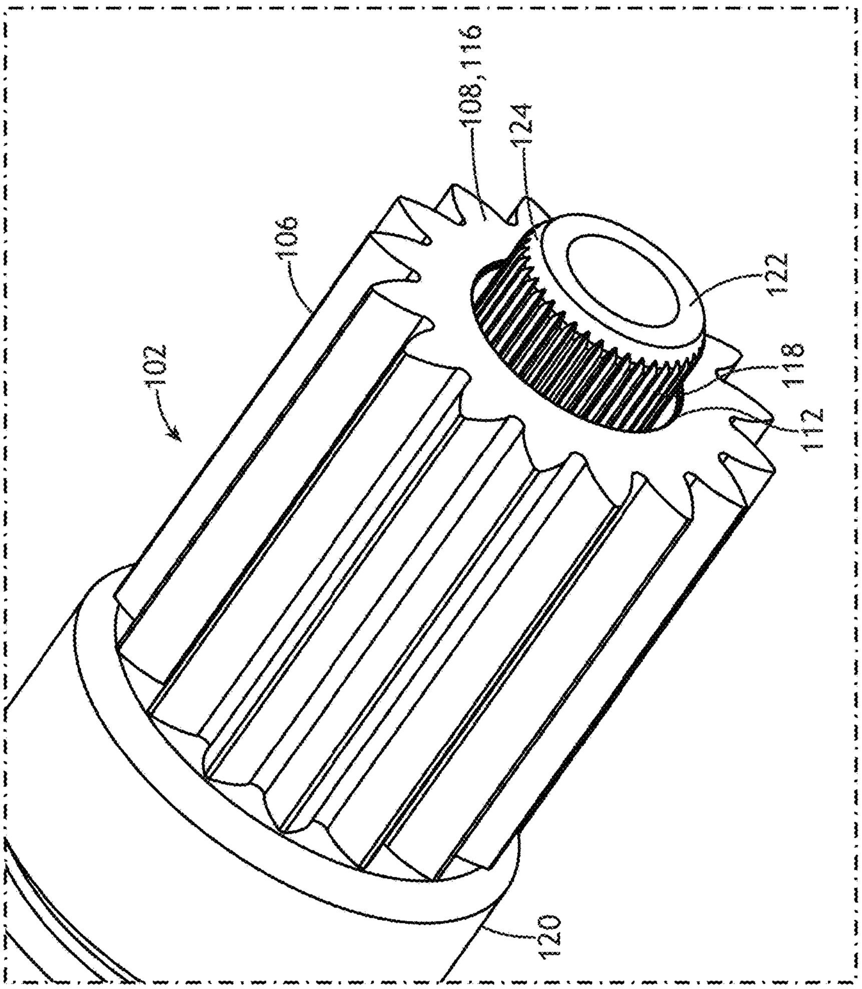
FIG. 1B illustrates a partial perspective view of the gear-and-shaft assembly, in accordance with one or more embodiments of the present disclosure.
Figure 1C:
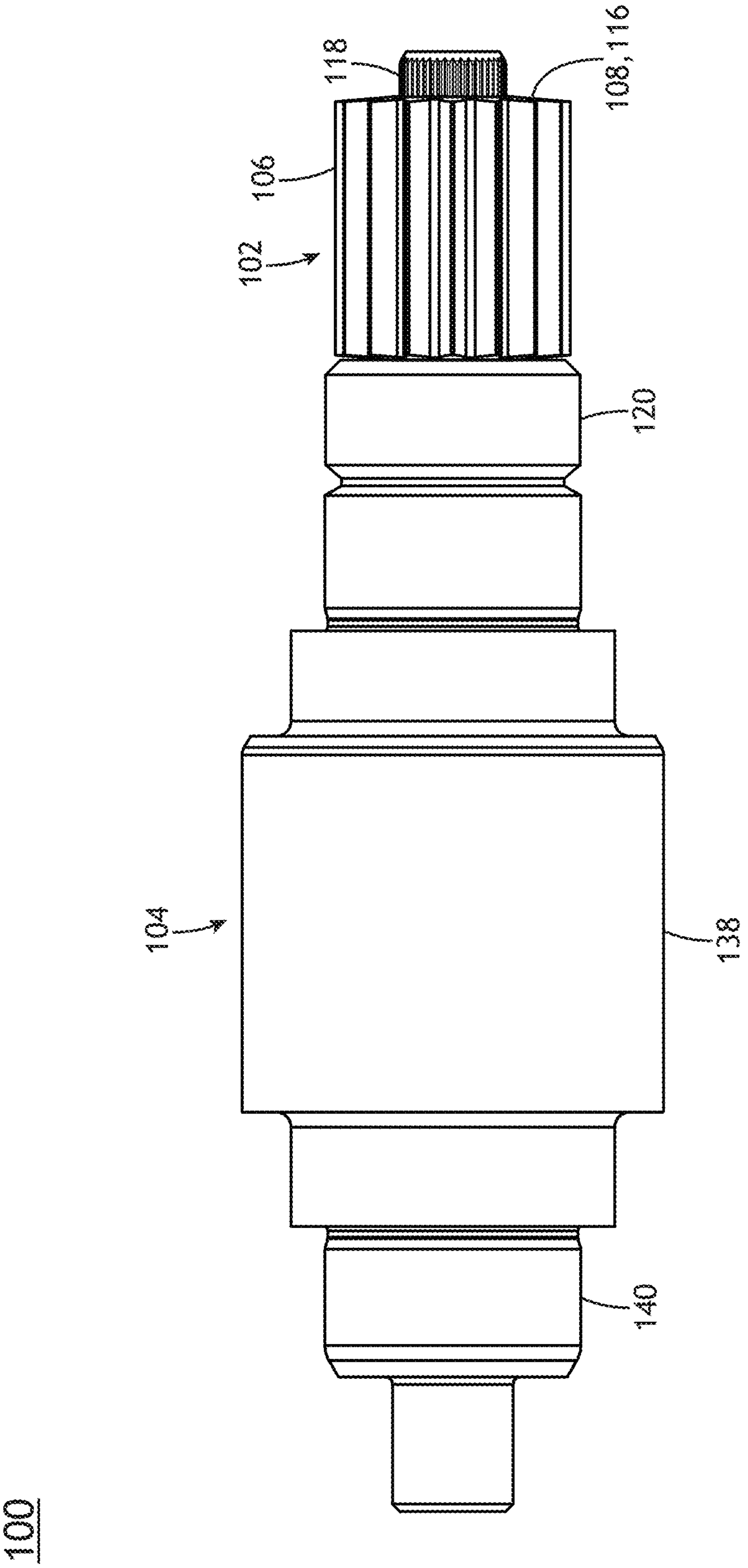
FIG. 1C illustrates a side view of the gear-and-shaft assembly, in accordance with one or more embodiments of the present disclosure.
Figure 1D:
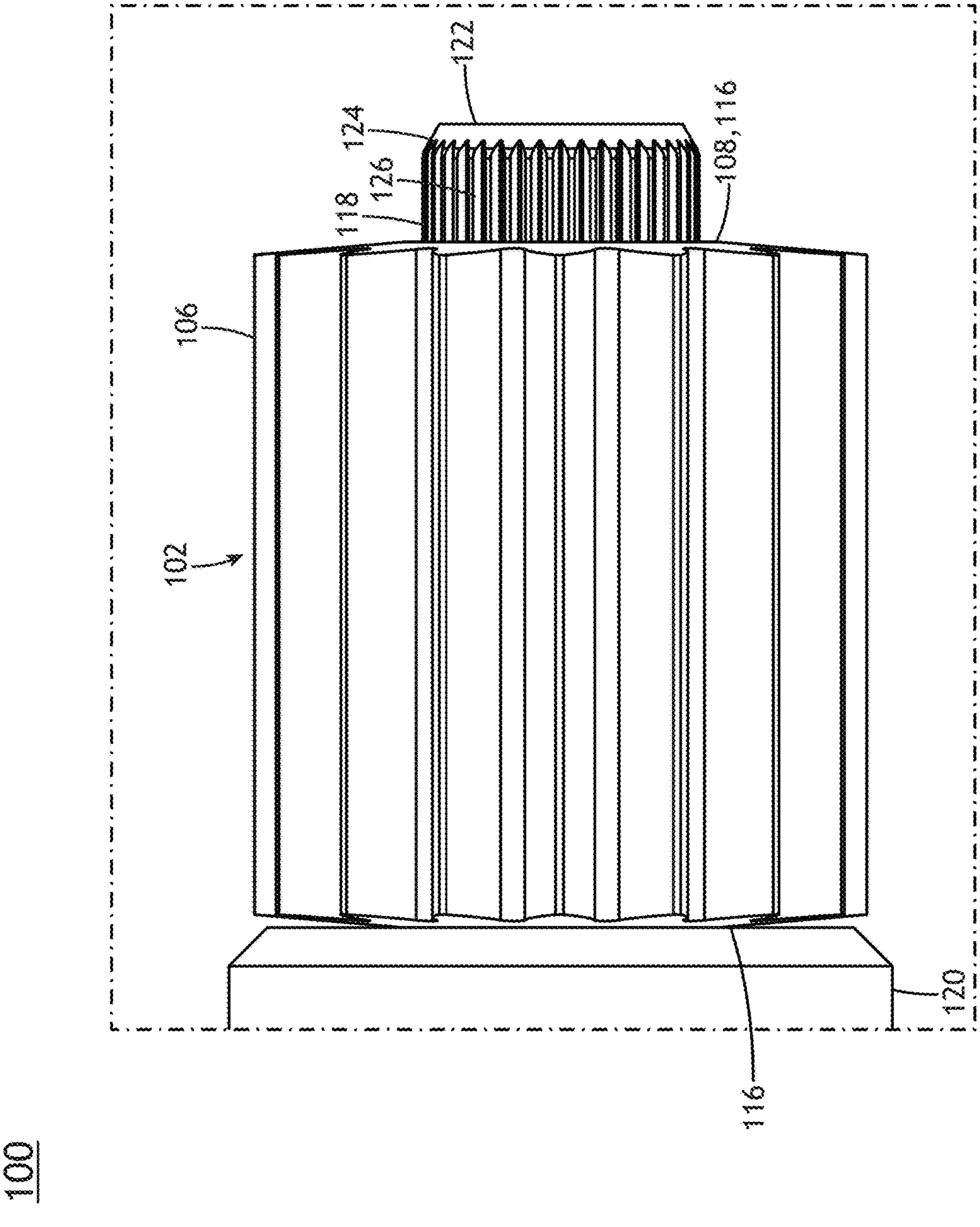
FIG. 1D illustrates a partial side view of the gear-and-shaft assembly, in accordance with one or more embodiments of the present disclosure.
Figure 1E:
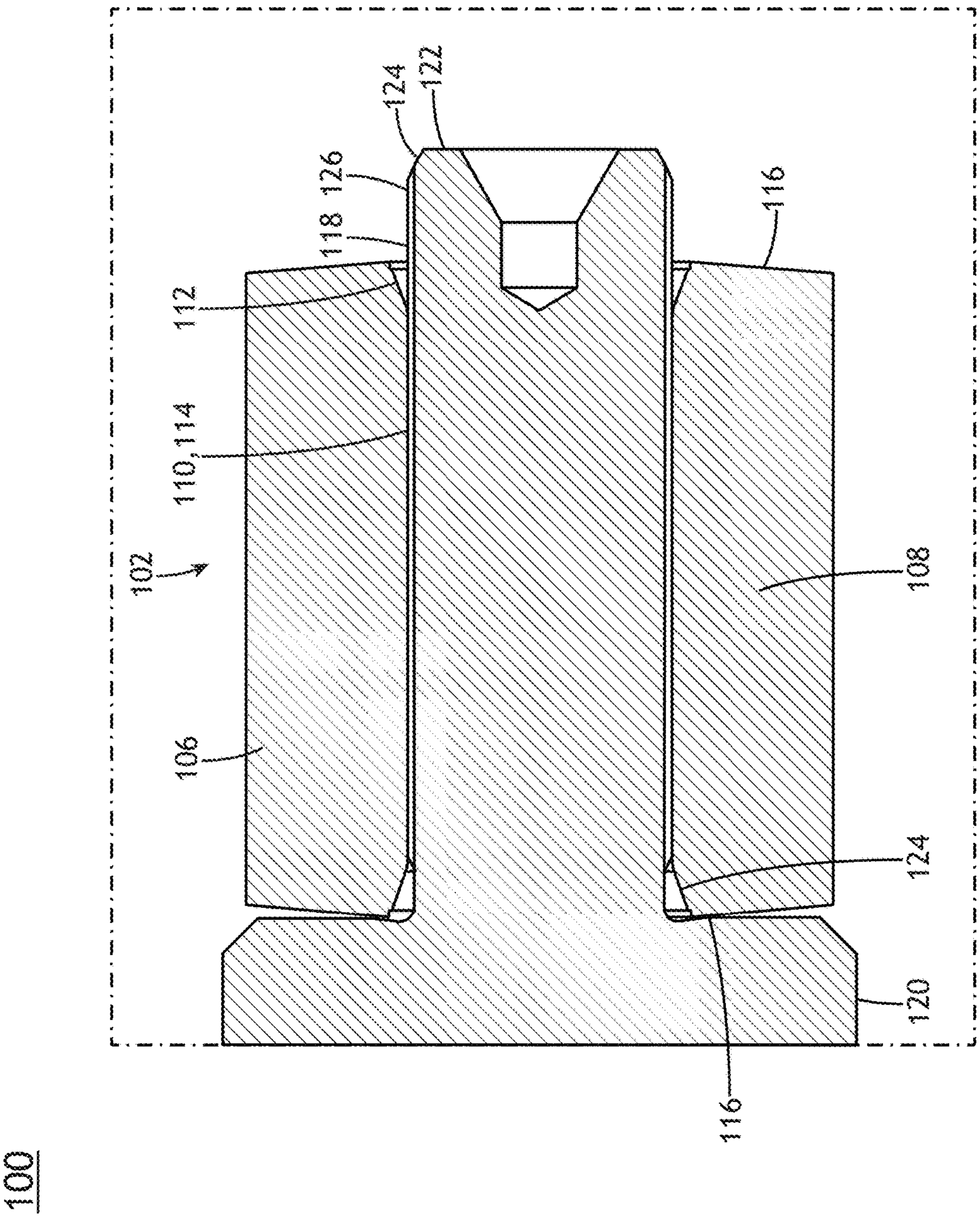
FIG. 1E illustrates a partial section view along the partial side view of the gear-and-shaft assembly, in accordance with one or more embodiments of the present disclosure.
Figure 1F:
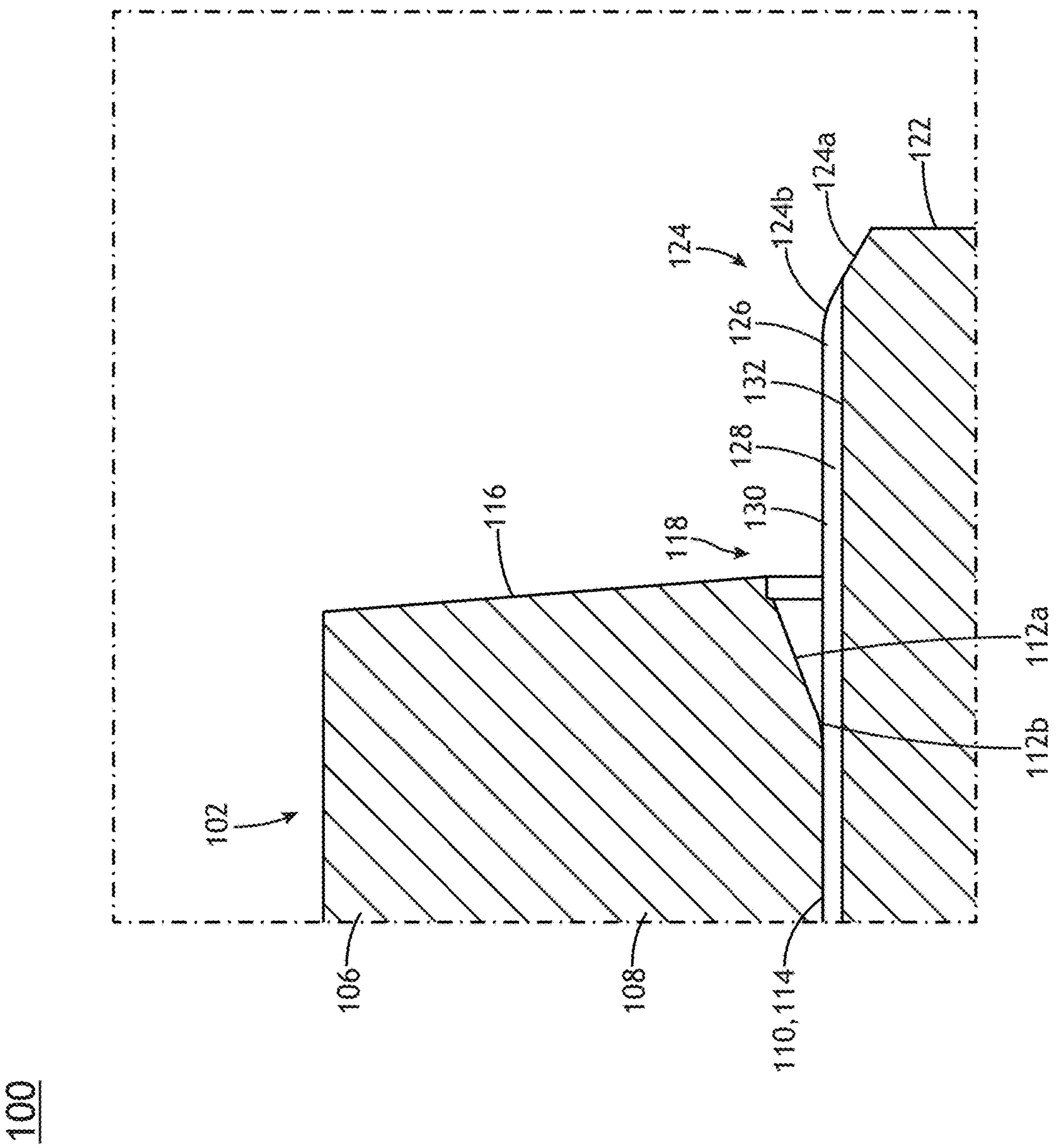
FIG. 1F illustrates a partial section view of the partial section view to more clearly illustrate lead-in surfaces of the gear and shaft, in accordance with one or more embodiments of the present disclosure.
Figure 1G:
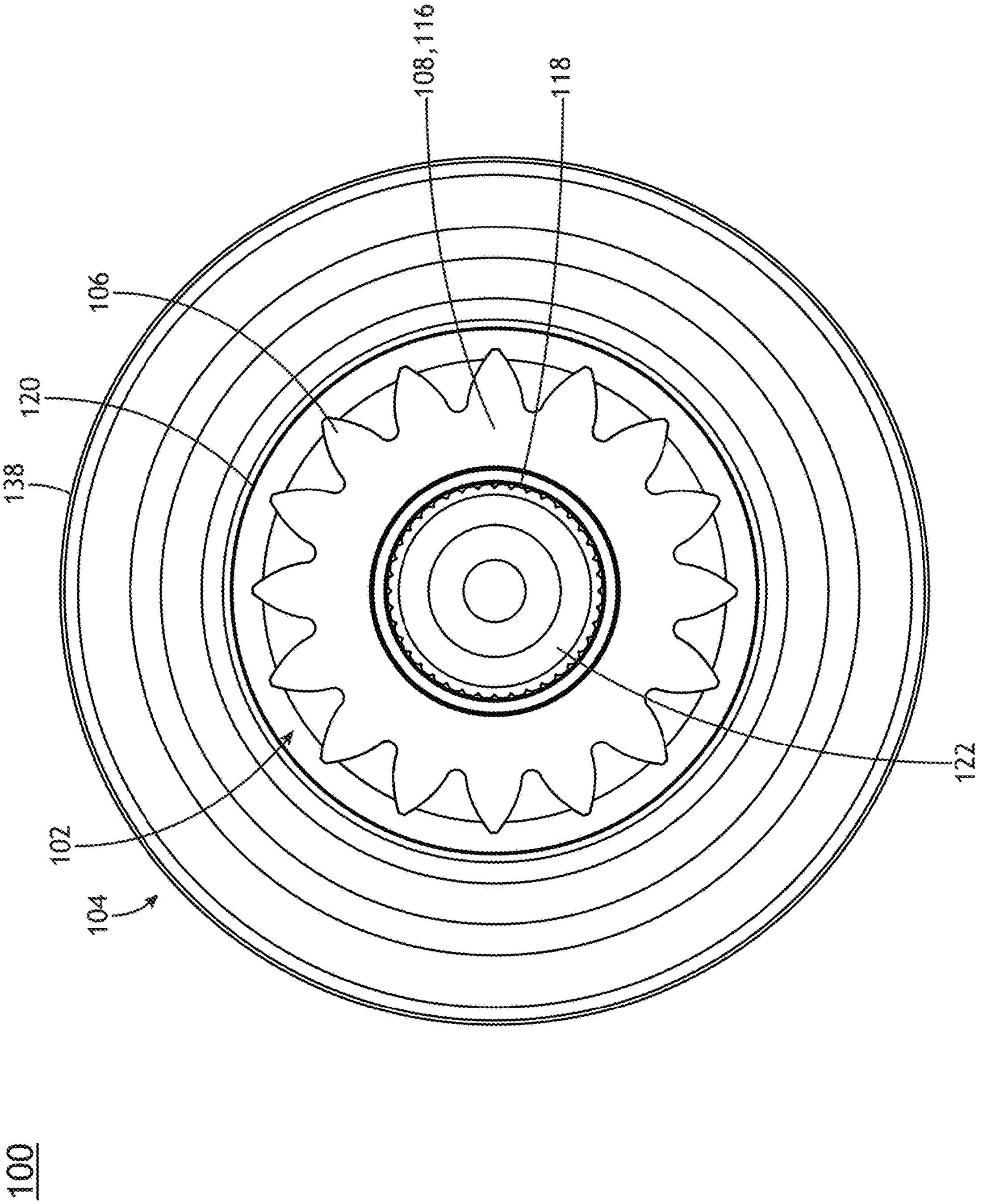
FIG. 1G illustrates a front view of the gear-and-shaft assembly, in accordance with one or more embodiments of the present disclosure.
Figure 1H:
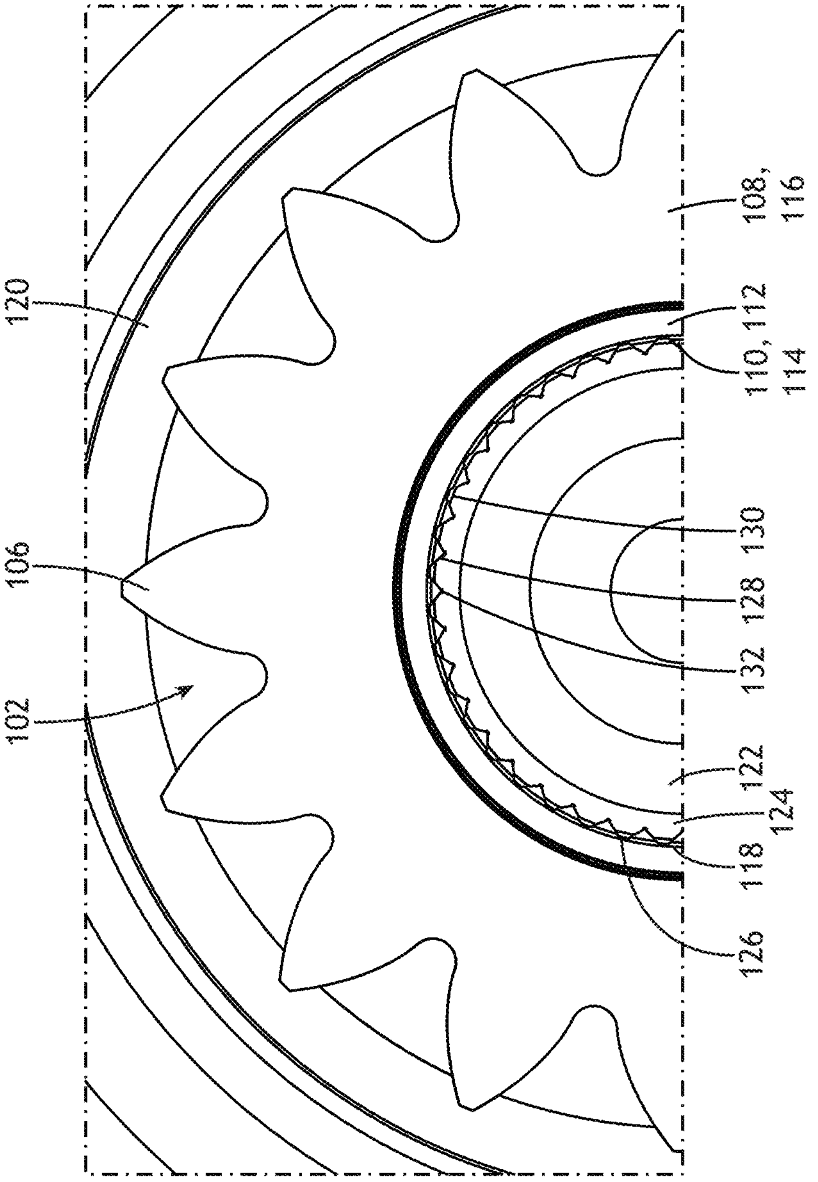
FIG. 1H illustrates a partial front view of the gear-and-shaft assembly, in accordance with one or more embodiments of the present disclosure.
Figure 1I:
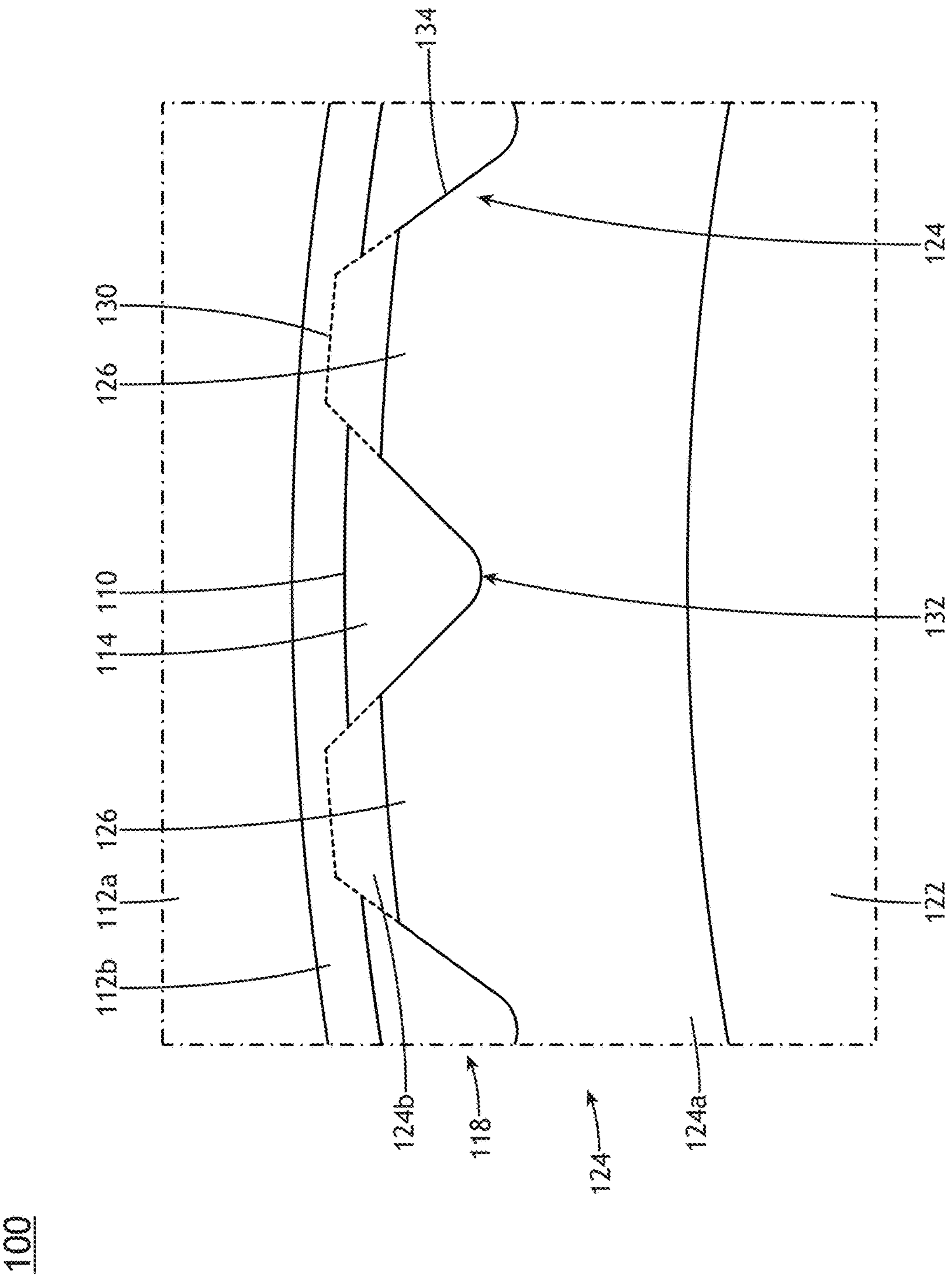
FIG. 1I illustrates a partial front view of the partial front view to more clearly illustrate the flanks and top land of the gear before deformation, in accordance with one or more embodiments of the present disclosure.
Figure 1J:
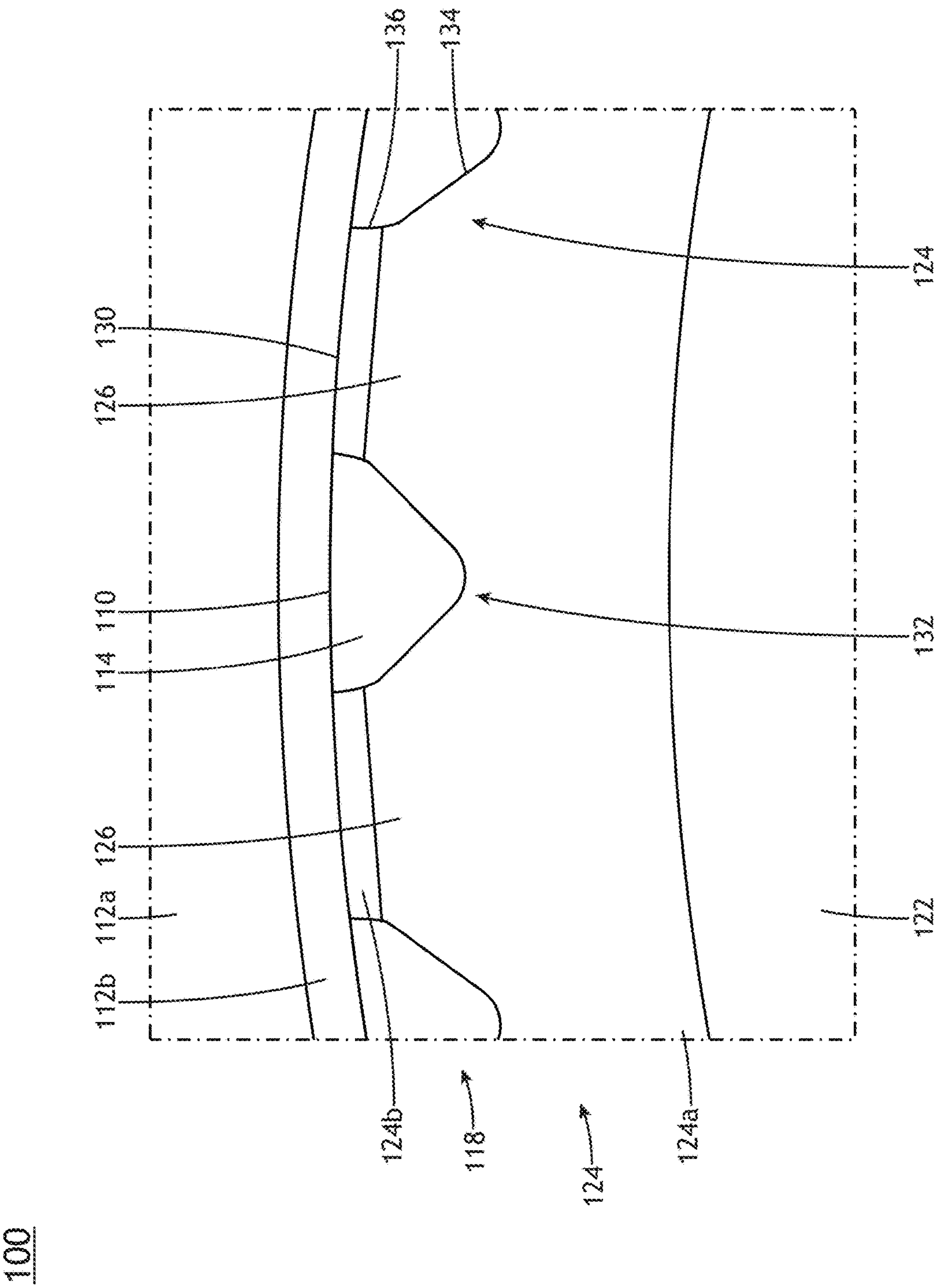
FIG. 1J illustrates a partial front view of the partial front view to more clearly illustrate the flanks and top land of the gear after deformation, in accordance with one or more embodiments of the present disclosure.
Figure 1K:
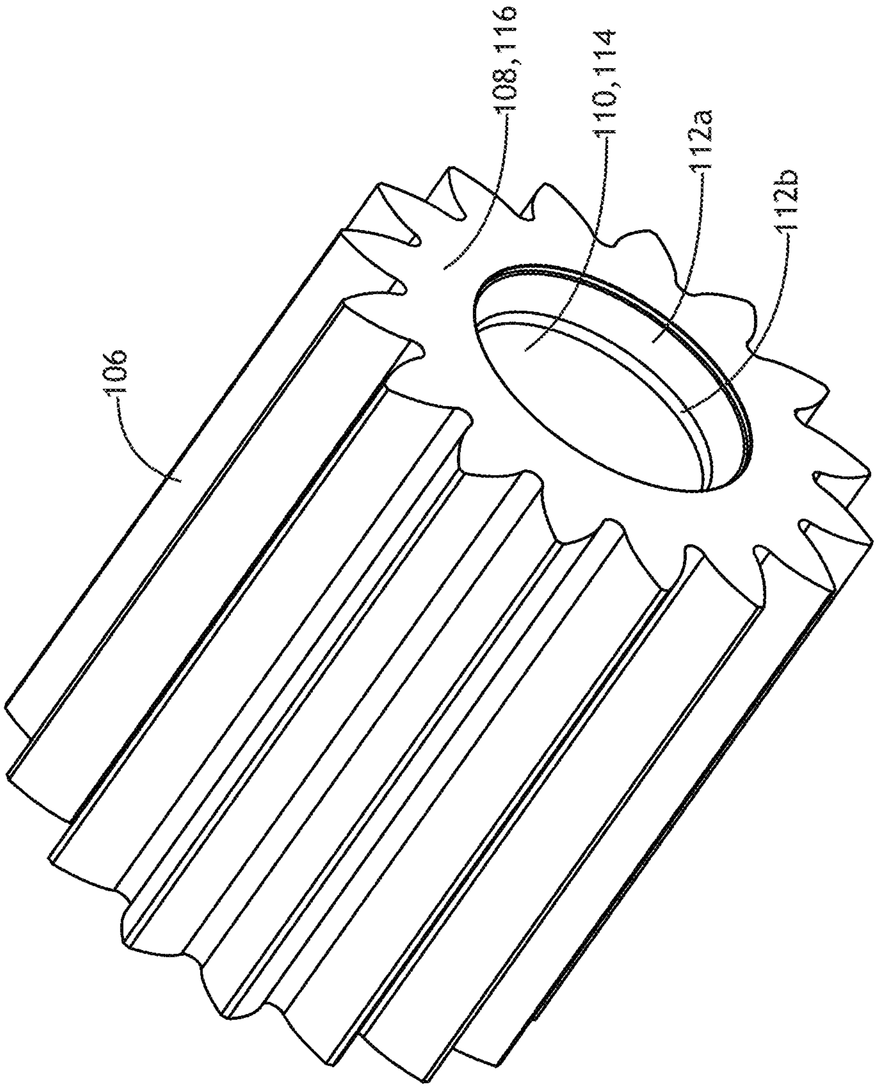
FIG. 1K illustrates a perspective view of the gear, in accordance with one or more embodiments of the present disclosure.
Figure 1L:
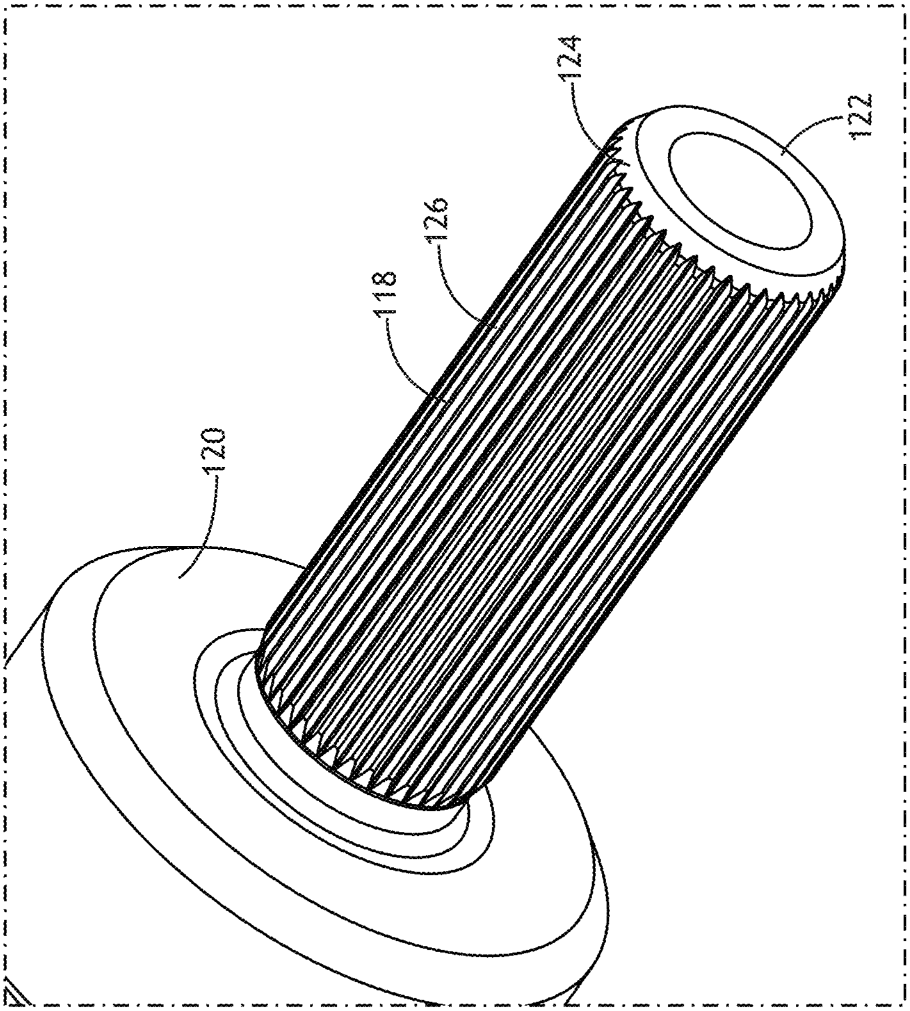
FIG. 1L illustrates a partial perspective view of the external spline of the shaft, in accordance with one or more embodiments of the present disclosure.
Figure 1M:
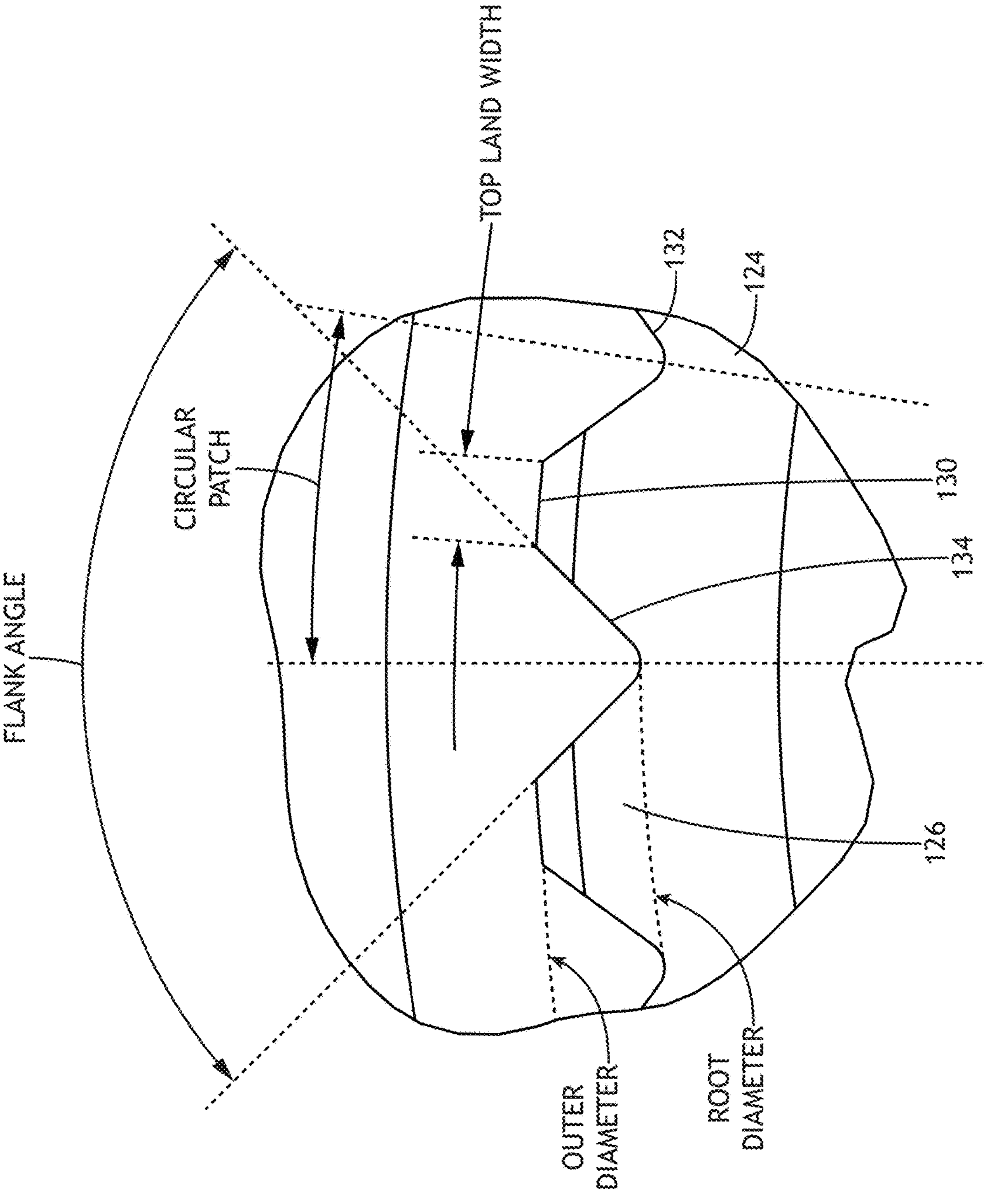
FIG. 1M illustrates a partial front view of the external spline of the shaft, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to mating a powder metal gear to a shaft. A gear-and-shaft assembly may mate a powder metal gear to an external spline of a shaft using an interference fit between the gear and the external spline. The gear may be sintered hardened to be harder than the external spline, such that the external spline is deformed by the interference fit without deforming or cutting the gear. A rotating assembly may include the gear-and-shaft assembly and a rotor. A method may include pressing the gear onto the shaft.

FIGS. 1A-1M illustrate a gear-and-shaft assembly 100, in accordance with one or more embodiments of the present disclosure. The gear-and-shaft assembly 100 may include a gear 102 and a shaft 104. The gear 102 may include external teeth 106 and a gear body 108. The gear body 108 may include an inner-cylindrical surface 110, lead-in surfaces 112, a centered-through hole 114, and/or gear-body axial-end faces 116. The shaft 104 may include an external spline 118, a shoulder 120, a shaft axial-end face 122, a lead-in surface 124, a rotor-carrier section 138, and/or a bearing-carrier section 140. The external spline 118 may include external teeth 126. The external teeth 126 may include flanks 128, top land 130, and/or fillet roots 132. The flanks 128 may include undeformed sections 134 and/or deformed sections 136.

The gear 102 and the shaft 104 may be fit together and configured to rotate together about a center axis of the gear-and-shaft assembly 100. The gear 102 may be disposed radially outwards of and axially aligned with the external spline 118. The inner-cylindrical surface 110 and the external spline 118 may include an interference fit. The interference fit may be a force connection (e.g., clamping by the interference fit). The interference fit may be a mating for a powder metal gear to shaft. For example, the inner-cylindrical surface 110 and the external teeth 126 of the external spline 118 may include the interference fit. For instance, the inner-cylindrical surface 110 and the top land 130 of the external teeth 126 may include the interference fit. The interference fit may be between the inner-cylindrical surface 110 and the top land 130.

The external teeth 126 may couple torque between the external spline 118 and the inner-cylindrical surface 110 of the gear body 108 by the interference fit. For example, the top land 130 may couple torque between the external spline 118 and the inner-cylindrical surface 110 of the gear body 108. The interference fit may not permit relative movement between the gear 102 and the shaft 104. The gear 102 and the shaft 104 may be configured for rotary motion such that the rotation may continue indefinitely (e.g., not an oscillating or reciprocating motion). The gear 102 and the shaft 104 may each be concentric to the center axis of the gear-and-shaft assembly 100, such that the rotation of the gear 102 and the shaft 104 is not an orbital motion. The gear 102 may be a toothed gear for conveying the rotary motion (e.g., for conveying the motion as part of a gear train which is not depicted).

The interference fit between the gear 102 and the external spline 118 may be non-disconnectable. For example, the interference fit may be non-disconnectable up to a slip torque. The slip torque may also be referred to as an over-torque. The slip torque may be a torque at which the interference fit fails and permits relative motion between the gear 102 and the external spline 118. The slip torque may be controlled based on the overlap between the outer diameter of the top land 130 and the inner diameter of the inner-cylindrical surface 110. The interference fit may be maintained after the torque on the shaft 104 is reduced below the slip torque. Thus, the gear 102 may be allowed to slip relative to the external spline 118 at a slip torque that would damage the gear 102, and continue operation after reducing the torque below the slip torque. Thus, the interference fit may maintain good torque transmission characteristics up to the slip torque and further prevent damaging the gear 102 above the slip torque. As an example, the interference fit was experimentally determined to hold a torque of 12 N-m even after repeatedly undergoing a slip-torque of 15 N-m where a nominal size of the inner-cylindrical surface 110 is 7 mm, although these values are not intended to be limiting.

The interference fit may include any suitable interference fit, such as, a locational interference fit (e.g., an H7/p6 fit, a P7/h6 fit), a medium drive fit (e.g., a H7/s6 fit, a S7/h6 fit), or a force fit (e.g., an H7/u6 fit, a U7/h6 fit). For example, the outer diameter of the top land 130 and the inner diameter of the inner-cylindrical surface 110 may include an overlap of between 0.4% and 0.8% of the inner diameter of the inner-cylindrical surface 110. For instance, the overlap may be between 0.5% and 0.7%. The inner-cylindrical surface 110 and the external spline 118 may include a select tolerance for the interference fit. For example, the inner-cylindrical surface 110 and the external spline 118 may include an international tolerance (IT) grade of IT8 for the interference fit.

The top land 130 and/or the deformed sections 136 may be deformed. The top land 130 and/or the deformed sections 136 may be deformed radially inwards and/or circumferentially outwards. For example, the top land 130 and/or the deformed sections 136 may be deformed radially inwards and/or circumferentially outwards to fill a space of the centered-through hole 114 between the flanks 128. The top land 130 and/or the deformed sections 136 may be deformed by the interference fit. The top land 130 may be directly deformed by the abutment with the inner-cylindrical surface 110. The deformed sections 136 may be deformed by a radial force applied to the top land 130 from the inner-cylindrical surface 110. The top land 130 and/or the deformed sections 136 may be elastically-deformed or plastically-deformed. The top land 130 and/or the deformed sections 136 may or may not return to an initial shape if the gear 102 is removed from the external spline 118. For example, the top land 130 and/or the deformed sections 136 may be plastically deformed and may retain the deformed shape. The plastic deformation may mean that the top land 130 and/or the deformed sections 136 do not recover to an initial undeformed shape after being removed from the interference fit. By way of another example, the top land 130 and/or the deformed sections 136 may be elastically deformed and may retain the shape due to the abutment with the inner-cylindrical surface 110.

The external teeth 106 and/or the gear body 108 may be concentric with the center axis of the gear-and-shaft assembly 100. The external teeth 106 may be disposed radially outwards of, axially aligned with, and adjoined to the gear body 108. The external teeth 106 may be considered "external" in that the external teeth 106 project radially outwards from the gear body 108. The gear body 108 may be disposed radially inwards of and axially aligned with the external teeth 106. The gear body 108 may be a cylindrical portion of the gear 102, excluding the external teeth 106. The gear body 108 may support each of the external teeth 106 and transfer torque between the shaft 104 and the external teeth 106.

The inner-cylindrical surface 110 may be an inner diameter of the gear body 108. The inner-cylindrical surface 110 may be cylindrical for the axial length of the inner-cylindrical surface 110 and/or for most of the axial length of the gear body 108. The inner-cylindrical surface 110 may define the centered-through hole 114. The centered-through hole 114 may also be referred to as an inner bore. The centered-through hole 114 may be a through-hole defined through the axial length of the gear 102. The centered-through hole 114 may also be centered with the center axis of the gear-and-shaft assembly 100. The inner-cylindrical surface 110 may define the centered-through hole 114. Notably, the inner-cylindrical surface 110 may be smooth and may not include an internal spline. The inner-cylindrical surface 110 may be smooth for abutting with the external spline 118.

The gear-body axial-end faces 116 may define the axial ends of the gear body 108. The gear-body axial-end faces 116 may extend radially from the inner-cylindrical surface 110 to the external teeth 106. The gear-body axial-end faces 116 may also extend radially and axially from the inner-cylindrical surface 110 to the external teeth 106. For example, the gear-body axial-end faces 116 may be arranged perpendicular to or at an acute angle relative to the center axis of the gear-and-shaft assembly 100. As depicted, the gear-body axial-end faces 116 may be arranged at an acute angle relative to the center axis of the gear-and-shaft assembly 100, although this is not intended to be limiting.

The gear 102 may be any suitable type of gear. For example, the gear 102 may be a spur gear, a helical gear, a double helical gear, a worm gear, or the like. Similarly, the external teeth 106 may be any suitable type of teeth. For example, the external teeth 106 may be straight teeth, helical teeth, double helical teeth, worm teeth, or the like. In embodiments, the gear 102 is a spur gear and the external teeth 106 are straight teeth, although this is not intended to be limiting. The gear-and-shaft assembly 100 may be advantageous for any of the various types of the gear 102 and the external teeth 106.

The external spline 118 may extend along the center axis of the gear-and-shaft assembly 100. The external spline 118 may be considered "external" by extending radially from a body of the shaft 104. The external teeth 126 may be straight teeth which are aligned parallel to the center axis of the gear-and-shaft assembly 100 and extend along the axial length of the external spline 118. The external teeth 126 may be defined in a polar array about the center axis of the gear-and-shaft assembly 100. For example, the external teeth 126 may be adjacent with each other around the circumference of the external spline 118.

The top land 130 may adjoin between the flanks 128. For example, each of the external teeth 126 may include a pair of the flanks 128 circumferentially adjoined by the top land 130. The outer diameter of the external spline 118 may be the outer diameter of the top land 130. The top land 130 may include an arc length. The arc length of the top land 130 may be defined by the flank angle, the outer diameter of the external spline 118, and/or the root diameter of the external spline 118. The top land 130 may abut the inner-cylindrical surface 110. For example, the top land 130 may abut the inner-cylindrical surface 110 for the entirety of the arc length of the top land 130. Increasing the arc length of the top land 130 may be beneficial to improve the strength of the gear-and-shaft assembly 100.

The flanks 128 may adjoin between the top land 130 and the fillet roots 132. For example, the flanks 128 may adjoin between the top land 130 and the fillet roots 132 via the undeformed sections 134 and/or the deformed sections 136.

The deformed sections 136 may adjoin between the undeformed sections 134 and/or the top land 130. The deformed sections 136 may not abut the inner-cylindrical surface 110. The shape of the deformed sections 136 may not be designed. Rather, the shape of the deformed sections 136 may occur by the deformation of the top land 130 and the deformed sections 136 in the interference fit. In this regard, the external teeth 126 may not be involute teeth, the point between the undeformed sections 134 and the deformed sections 136 may not be a pitch point, and/or the deformed sections 136 may not be defined relative to a base circle. Rather, the shape of the flanks 128 may be based on the deformation.

The undeformed sections 134 may adjoin between the fillet roots 132 and/or the deformed sections 136. The undeformed sections 134 may be undeformed. For example, the undeformed sections 134 may not be plastically deformed when pressing the gear 102 onto the external spline 118, such that the flank angle is maintained. The undeformed sections 134 may or may not be elastically deformed when pressing the gear 102 onto the onto the external spline 118, before returning to the shape of the undeformed sections 134.

The fillet roots 132 may adjoin with the flanks 128. For example, the fillet roots 132 may adjoin with the undeformed sections 134 of the flanks 128. The fillet roots 132 may be a concave portion of the external spline 118 where the joins the external teeth 126 with a bottom of the external spline 118. The fillet roots 132 may reduce or eliminate a stress riser between the external teeth 126 and the bottom of the external spline 118. The fillet roots 132 may also adjoin between adjacent of the flanks 128. For example, the fillet roots 132 may be continuous and adjoin between adjacent of the undeformed sections 134 of the flanks 128 with the external spline 118 having no bottom land.

The external teeth 126 may include a root diameter. The root diameter may be the inner diameter of the circle that contains the roots or bottoms of the external teeth 126. For example, the fillet roots 132 may include the root diameter. The root diameter may be the radially-innermost portion of the fillet roots 132. Notably, the root diameter is not the fillet radius of the fillet roots 132. The fillet roots 132 may include any suitable fillet radius. The root diameter may be defined as a percentage of the outer diameter of the top land 130. The root diameter may control the whole depth of the external teeth 126 and/or the arc length of the top land 130. As the root diameter increases towards 100% of the outer diameter of the top land 130, the whole depth of the external teeth 126 decrease and the external spline 118 is more of a solid shaft. As the root diameter increases away from 100% of the outer diameter of the top land 130, the external teeth 126 may form more of a triangular shape which decreases the arc length of the top land 130. The root diameter may be selected to control the whole depth of the external teeth 126 and/or the arc length of the top land 130. For example, the root diameter of the external teeth 126 may be between 92% and 98% of the outer diameter of the top land 130. For instance, the root diameter of the external teeth 126 may be between 93% and 97% of the outer diameter of the top land 130. In embodiments, the root diameter of the external teeth 126 may be approximately 95% root diameter of the outer diameter of the top land 130.

The external spline 118 may include a flank angle. The flank angle may be the angle between the flanks 128 of adjacent of the external teeth 126. For example, the flank angle may be the angle between the undeformed sections 134 of the flanks 128 of adjacent of the external teeth 126. The flank angle may be a select angle. For example, the flank angle may be between 80 degrees and 100 degrees. For instance, the flank angle may be between 85 degrees and 95 degrees. In embodiments, the flank angle may be approximately 90 degrees.

The interference fit between the gear 102 and the external spline 118 may be formed by pressing the gear 102 may be onto the external spline 118. The external spline 118 may be pressed into the centered-through hole 114 and/or abut the inner-cylindrical surface 110, as the gear 102 is pressed onto the external spline 118. The top land 130 and/or the deformed sections 136 may be deformed by pressing the gear 102 onto the external spline 118. The external teeth 126 may include only the undeformed sections 134 and not the deformed sections 136 before the gear 102 is pressed onto the external spline 118. The inner-cylindrical surface 110 may force the top land 130 and the deformed sections 136 to deform, fitting tightly to the inner-cylindrical surface 110 with minimal cutting.

The external spline 118 may include a circular pitch. The circular pitch may define the angle between adjacent of the external teeth 126 in the polar array. The external spline 118 may include any number of the external teeth 126. The number of the external teeth 126 may be defined based on the circular pitch (e.g., the number of the external teeth 126 may be 360 degrees divided by the circular pitch). The circular pitch may be any suitable number in degrees. For example, the circular pitch may be between 8 and 10 degrees (e.g., 9 degrees), although this is not intended to be limiting. In one example, the flank angle of the external spline 118 is 90 degrees, with a root diameter that is 95% the size of the outer diameter of the top land 130. The flank angle and the root diameter may control the circular pitch and may allow for a regular patterned spline of forty teeth.

The external spline 118 may include one or more dimensions that control the ability to press the gear 102 onto the external spline 118 and/or the strength of the gear-and-shaft assembly 100. For example, the outer diameter of the top land 130, the root diameter, and/or the flank angle may control the ability to press the gear 102 onto the external spline 118 and/or the strength of the gear-and-shaft assembly 100. If the outer diameter of the top land 130 is too small, the slip torque of the interference fit may be too low. If the outer diameter of the top land 130 is too large, the press force to form the interference fit may be too large and may break the gear 102 and/or the external spline 118 due to a hoop stress. If the flank angle is too small and/or the root diameter is too large, then the external teeth 106 may not have room for the deformation of the top land 130 and/or the deformed sections 136 when pressing the gear 102 onto the external spline 118. For example, the press force may increase because there is less space in which the top land 130 and the deformed sections 136 may be deformed. If the flank angle is too large and/or the root diameter is too small, then the arc length of the top land 130 may be too small such that the slip torque of the interference fit is reduced.

The gear 102 may not be deformed or cut by the interference fit.

Preventing deforming the gear 102 may be beneficial to ensure a precise gear mesh and/or reduce backlash between the gear 102 and an external gear of a geartrain. The external spline 118 may be relatively soft and the gear 102 may be relatively hard. For example, the external spline 118 may be softer than the gear 102. The softer hardness for the external spline 118 may be beneficial for deforming the external teeth 126 without breaking the external teeth 126, preventing cutting the inner-cylindrical surface 110 when pressing the external spline 118 into the centered-through hole 114, and/or preventing deforming the gear 102.

The external spline 118 may be a carbon steel. The carbon steel may be a low-carbon or a medium-carbon steel. The low-carbon steel may also be referred to as soft steel, mild steel, or the like. The low-carbon steel may include any suitable low-carbon steel, such as 1018 steel or the like. The medium-carbon steel may include any suitable medium-carbon steel, such as 1045 steel or the like. The carbon steel may be unhardened. For example, the carbon steel may be unhardened by not being hardened by a heat treatment and quenching process. The low-carbon steel and/or the medium-carbon steel together with the carbon steel being unhardened may be beneficial for the external spline 118 to be less hard than the gear 102 and/or to enable the plastic deformation of the external teeth 126 when pressing the external spline 118 into the centered-through hole 114.

The gear 102 may be sintered metal. The sintered metal may be sintered from a metallic powder. The sintered metal may be sintered by heating the metallic powder and joining adjacent particles by diffusion or superficial melting into the sintered metal. The sintered metal and/or the metallic powder may be selected based on material availability, strength, fabricability, ability to fuse during sintering, or the like. For example, the sintered metal may include a hardened-ferrous alloy or the like. The hardened-ferrous alloy may be an alloy of carbon, iron, and one or more of copper, manganese, molybdenum, nickel, silicon, or the like. For example, the gear 102 may be a steel alloy which is porous, with oils trapped in the pores of the sintered metal. The gear 102 may be sinter hardened. The gear 102 may be sintered hardened by being the sintered metal. The gear 102 being sinter hardened, may create a hard surface for joining with the external spline 118. The gear 102 may include a select hardness. For example, a Vickers hardness of the gear 102 may be HV0.1 520 min. The sinter-hardening may be beneficial to prevent deforming the gear 102.

The lead-in surfaces 112 and/or the lead-in surface 124 may lead the external spline 118 into the centered-through hole 114 when assembling the gear-and-shaft assembly 100. The lead-in surfaces 112 and/or the lead-in surface 124 may be beneficial for ease-of-assembly when pressing the gear 102 onto the shaft 104.

The lead-in surfaces 112 may be defined at one axial end or both axial ends of the inner-cylindrical surface 110. The lead-in surfaces 112 may be defined between the inner-cylindrical surface 110 and one or both of the gear-body axial-end faces 116. For example, the gear body 108 may include the lead-in surfaces 112 at both axial ends of the inner-cylindrical surface 110, such that the gear 102 is reversible and may be assembled onto the shaft 104 in either direction. The lead-in surfaces 112 may adjoin between the inner-cylindrical surface 110 and/or the gear-body axial-end faces 116. The lead-in surfaces 112 may be set at one or more acute angles relative to the inner-cylindrical surface 110 and/or the gear-body axial-end faces 116. For example, the lead-in surfaces 112 may be a chamfer surface, a fillet surface, a chamfer and fillet surface, or the like. In embodiments, the lead-in surfaces 112 is the chamfer and fillet surface. For example, the lead-in surfaces 112 may include a chamfer surface **112*a* and a fillet surface 112*b*. The chamfer surface 112*a* may be disposed axially between the fillet surface 112*b* and the gear-body axial-end faces 116. The fillet surface 112*b* may be disposed axially between the inner-cylindrical surface 110 and the chamfer surface 112*a***.

The lead-in surface 124 may be defined at an axial end of the external spline 118. The lead-in surface 124 may be disposed axially between the external spline 118 and the shaft axial-end face 122. The lead-in surface 124 may adjoin between the external spline 118 and the shaft axial-end face 122. The lead-in surface 124 may be set at one or more acute angles relative to the external spline 118 and/or the shaft axial-end face 122. For example, the lead-in surface 124 may be a chamfer surface, a fillet surface, a chamfer and fillet surface, or the like. In embodiments, the lead-in surface 124 is the chamfer surface and fillet surface. For example, the lead-in surface 124 may include a chamfer surface 124*a* and a fillet surface 124*b*. The chamfer surface 124*a* may be disposed axially between the shaft axial-end face 122 and the fillet surface 124*b*. The fillet surface 124*b* may be disposed axially between the chamfer surface 124*a* and the external spline 118.

The angles of the chamfer surface 112*a* and/or the chamfer surface 124*a* may be selected such that the angles are not too high, causing the chamfer surface 112*a* to cut the external spline 118 or causing the chamfer surface 124*a* to cut the gear 102 when the gear 102 is pressed onto the external spline 118. In this regard, the lead-in surfaces 112 and/or the lead-in surface 124 do not cut or broach the external spline 118 or the gear 102 when the gear 102 is pressed onto the external spline 118. The angles of the chamfer surface 112*a* and/or the chamfer surface 124*a* may also be selected such that the angles are not too low, reducing the ease of leading the external spline 118 into the centered-through hole 114. The angles of the chamfer surface 112*a* and/or the chamfer surface 124*a* may be less than 30 degrees, relative to respective of the inner-cylindrical surface 110 and the external spline 118. For example, the angles of the chamfer surface 112*a* and/or the chamfer surface 124*a* may be between 10 and 30 degrees (e.g., 20 degrees).

The fillet surface 112*b* and/or the fillet surface 124*b* may prevent a sharp corner that acts as an axial cutting surface when pressing the external spline 118 into the centered-through hole 114 (e.g., to prevent broaching). The fillet surface 112*b* and/or the fillet surface 124*b* may include any suitable radius.

The external spline 118 may be adjoined with the shoulder 120. The shoulder 120 may be disposed radially outwards of and/or axially offset from the external spline 118. For example, the shoulder 120 may be disposed axially between the external spline 118 and the rotor-carrier section 138. The gear 102 may be radially aligned with, axially offset from, and/or abut the shoulder 120. For example, the gear body 108 of the gear 102 may abut the shoulder 120. For instance, one of the gear-body axial-end faces 116 may abut the shoulder 120. The shoulder 120 may provide a backstop by which the gear 102 may be pressed onto the shaft 104 up to the shoulder 120.

The rotor-carrier section 138 may be disposed radially outwards of and/or axially offset from the shoulder 120 and/or the rotor-carrier section 138. For example, the rotor-carrier section 138 may be disposed axially between the shoulder 120 and the bearing-carrier section 140. The bearing-carrier section 140 may be disposed radially inwards of and/or axially offset from the rotor-carrier section 138.

Figure 2:
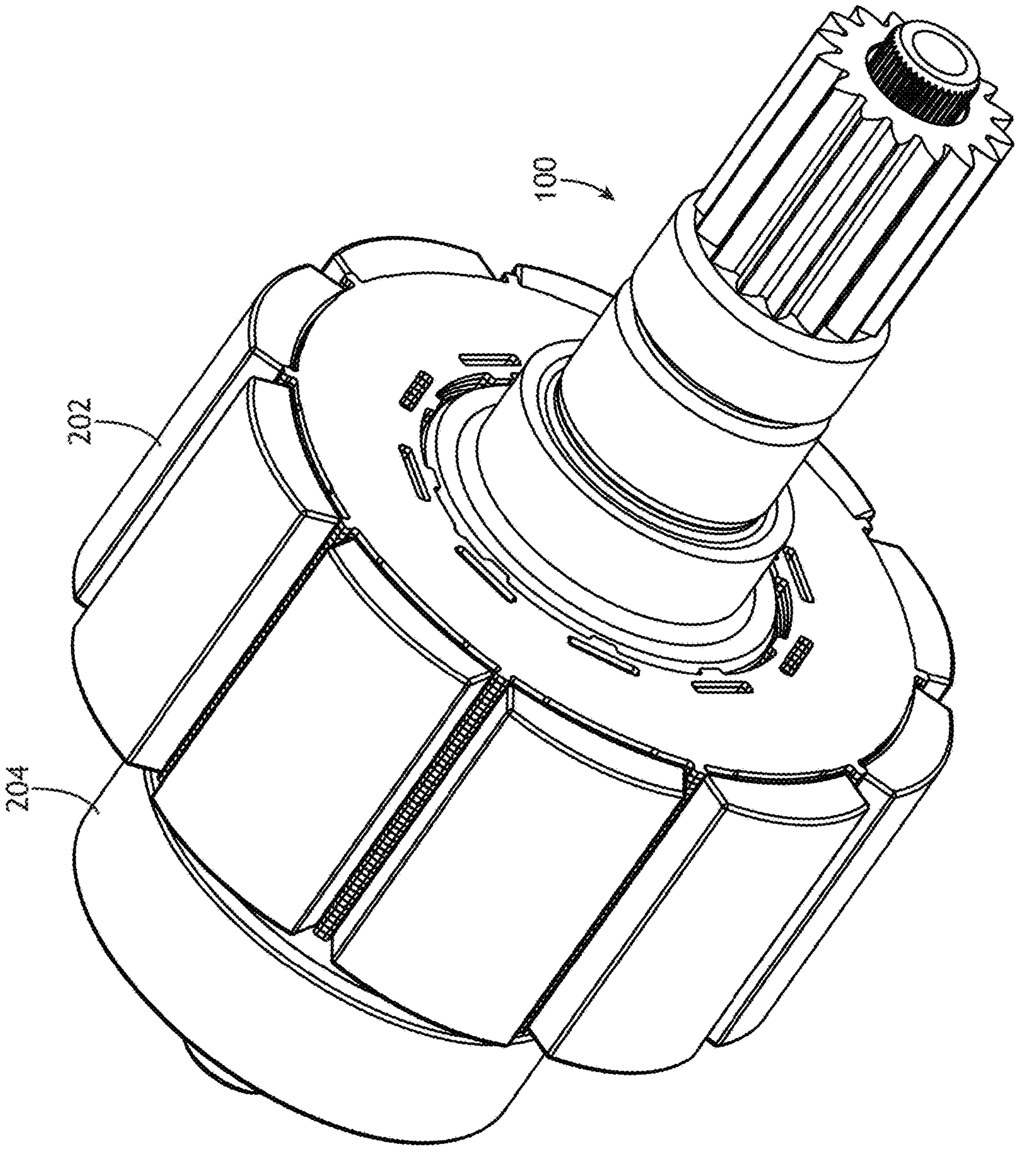
FIG. 2 illustrates a perspective view of a rotating assembly with the gear-and-shaft assembly, in accordance with one or more embodiments of the present disclosure.

FIG. 2 illustrates a rotating assembly 200, in accordance with one or more embodiments of the present disclosure. The rotating assembly 200 may include the gear-and-shaft assembly 100, a rotor 202, and/or a radial bearing 204.

The gear-and-shaft assembly 100, the rotor 202, and the radial bearing 204 may form a rigid body. The gear-and-shaft assembly 100, the rotor 202, and the radial bearing 204 may be coupled with zero degrees-of-freedom. The shaft 104 may adjoin between the gear 102, the rotor 202, and/or the radial bearing 204.

The rotor 202 and/or the radial bearing 204 may be adjoined to the shaft 104. For example, the rotor 202 may be adjoined to the rotor-carrier section 138. By way of another example, the radial bearing 204 may be adjoined to the bearing-carrier section 140 of the shaft 104. The rotating assembly 200 may be radially supported at one or both axial ends. For example, the radial bearing 204 may radially support the rotating assembly 200.

The rotor 202 may be a permanent magnet rotor, a wound rotor with a slip-coupling, or the like. The rotor 202 may be configured to drive the rotation of the rotating assembly 200. For example, the rotor 202 may be driven by a magnetic field.

The rotating assembly 200 may be a rotating assembly of a dynamo-electric machine (not depicted). Dynamo-electric refers to the conversion of mechanical energy to electrical energy or vice versa by electromagnetic means, as a generator or a motor. The rotor 202 may form a radial flux machine with a stator of the dynamo-electric machine. The rotor 202 and the stator may form an outer-rotor, inner-stator radial flux machine. For example, the dynamo-electric machine may be a swerve-drive actuator, or the like.

Figure 3:
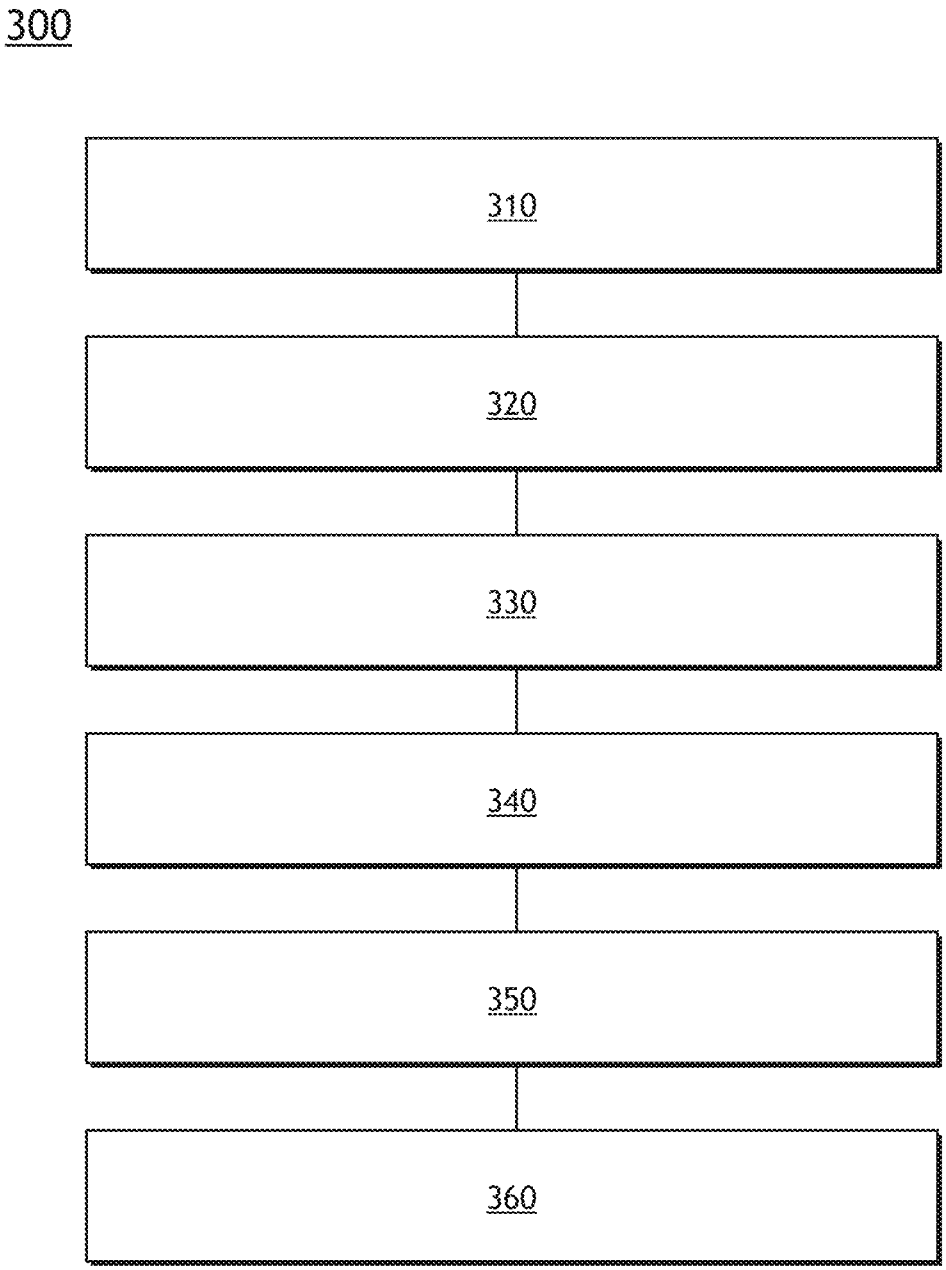
FIG. 3 illustrates a flow diagram of a method, in accordance with one or more embodiments of the present disclosure.

FIG. 3 illustrates a flow diagram of a method, in accordance with one or more embodiments of the present disclosure. The embodiments and the enabling technologies described previously herein in the context of the gear-and-shaft assembly 100 and the rotating assembly 200 should be interpreted to extend to the method 300. It is further noted, however, that the method 300 is not limited to the architecture of the gear-and-shaft assembly 100 and the rotating assembly 200.

In a step 310, a gear may be formed. For example, the gear 102 may be formed. The gear 102 may be formed by sintering.

In a step 320, an external spline in a shaft may be formed. For example, the external spline 118 in the shaft 104 may be formed. The external spline 118 may be formed by any suitable process. For example, the external spline 118 may be formed by cutting, rolling, broaching, knurling, or the like. Broaching the external spline 118 may allow for a uniform shape and size, but the outer diameter of the external spline 118 must be de-burred and cleaned. The external spline 118 can also be knurled, but the knurling process allows for a deviation in the tooth size, meaning that the number of teeth in the external spline 118 may vary.

In a step 330, the gear may be pressed onto the external spline. For example, the gear 102 may be pressed onto the external spline 118. The gear 102 may be pressed onto the external spline 118 to form the gear-and-shaft assembly 100. The gear 102 may be pressed onto the external spline 118 up to the shoulder 120. The pressing may form the interference fit between the gear 102 and the external spline 118. The pressing may also deform the external teeth 126 to form the top land 130 and/or the deformed sections 136.

The step 310 and the step 320 may occur in any order before the step 330. The step 310, the step 320, and the step 330 may be considered steps in forming the gear-and-shaft assembly 100.

In a step 340, the gear and the shaft may rotate together about a center axis of the gear-and-shaft assembly. For example, the gear 102 and the shaft 104 may rotate together about a center axis of the gear-and-shaft assembly 100. The gear 102 and the shaft 104 may be rotated by torque applied to the shaft 104. For example, the gear 102 and the shaft 104 may be rotated by torque applied to the rotor-carrier section 138 of the shaft 104 by the rotor 202. The gear 102 and the shaft 104 may be rotated in unison up to the slip torque of the interference fit between the gear 102 and the external spline 118.

In a step 350, the shaft may slip relative to the gear. For example, the shaft 104 may slip relative to the gear 102. The shaft 104 may slip relative to the gear 102 by the shaft 104 receiving a torque at or above the slip torque of the interference fit between the gear 102 and the external spline 118. For example, the rotor 202 may apply the torque at or above the slip torque of the interference fit to the rotor-carrier section 138 of the shaft 104. The shaft 104 may rotate at a higher rotational speed than the gear 102 when the shaft 104 slips relative to the gear 102. The slipping may prevent the gear 102 from damaging the external teeth 106.

In a step 360, the torque applied to the shaft may be reduced below the slip torque such that the gear and the shaft may rotate together about the center axis of the gear-and-shaft assembly. For example, the torque applied to the shaft 104 may be reduced below the slip torque such that the gear 102 and the shaft 104 may rotate together about the center axis of the gear-and-shaft assembly 100. The interference fit may remain operational after the torque is reduced below the slip torque. In this regard, the gear-and-shaft assembly 100 may return to a state which is functionally equivalent to the state of step 340.

The step 340, the step 350, and the step 360 may be considered steps in operating the gear-and-shaft assembly 100. The step 340, 350, and 360 may repeat many times when operating the gear-and-shaft assembly 100 during the life of the gear-and-shaft assembly 100. It is contemplated that repeated slippage of the shaft 104 relative to the gear 102 may reduce the slip torque over the life of the gear-and-shaft assembly 100 (e.g., due to further plastic deformation and/or metal fatigue of the external spline 118).

Referring generally again to the figures. The interference fit may allow for reduced stress in the gear 102, with a reliable torque transmission in both static and fatigue conditions. The interference fit provides adequate torsional fixation while also providing slippage at excessively high torques that would otherwise damage the external teeth 106 of the gear 102.

It is contemplated that the gear-body axial-end faces 116 may include a hub (not depicted). The hub may improve the rigidity of the gear 102.

Although the flanks 128 are described as including the undeformed sections 134, this is not intended as a limitation of the present disclosure. It is contemplated that the fillet roots 132 may adjoin the deformed sections 136 (not depicted). For example, the flanks 128 may be deformed up to the fillet roots 132. The flank angle may be the smallest angle between the deformed sections 136 of the flanks 128 of adjacent of the external teeth 126.

Although the gear 102 is described as including the external teeth 106, this is not intended to be limiting. It is further contemplated that the gear 102 may be any suitable gear which may be additively manufactured with the layers and which may include the gear body 108 which is harder than the external spline 118. For example, the gear 102 may be a cam gear (not depicted) with an external cam which may project radially outwards from the gear body 108. By way of another example, the gear 102 may be a Geneva-drive gear.

Although the fillet roots 132 are described as adjoining between adjacent of the flanks 128, this is not intended to be limiting. It is contemplated that the external spline 118 may include a bottom land (not depicted). The bottom land may be a surface of the external spline 118 between the flanks 128 of adjacent of the external teeth 126. For example, the bottom land may be disposed circumferentially between and adjoin the fillet roots 132 of adjacent of the external teeth 126. However, the addition of the bottom land may reduce the number of the external teeth 126 and/or a thickness of the external teeth 126. In this regard, adjoining the fillet roots 132 between adjacent of the flanks 128 may be beneficial to improve the abutment between the top land 130 and the inner-cylindrical surface 110.

Radial bearings may refer to any bearing which may bear a radial load. Similarly, thrust bearings may refer to any bearing which may bear an axial load. The radial bearings and/or the thrust bearings may include plain bearings (e.g., bushings), ball bearings, roller bearings, or the like.

As used herein, the term "axial" and derivatives thereof, such as "axially," shall be understood to refer to a direction along the axis. The term "coaxial" shall be understood to refer to a common axis. Further, the term "radial" and derivatives thereof, such as "radially," shall be understood in relation to the axis. For example, "radially outward" refers to further away from the axis, while "radially inward" refers to nearer to the axis. The term "circumference" or derivatives thereof, such as "circumferentially", may also be defined in reference to the center axis.

As used herein, the term "parallel" and "perpendicular" shall be understood as including a tolerance. For example, a first component may be parallel to a second component when an angularity between the first component and the second component, is within a select tolerance so closely resembling 0-degrees, for example, 1-degrees of tolerance or less, that the components would be considered arranged in parallel to the naked eye. By way of another example, the first component may be perpendicular or normal to the second component when an angularity between the first component and the second component, is within a select tolerance so closely resembling 90-degrees, for example, 1-degrees of tolerance or less, that the components would be considered arranged perpendicular to the naked eye.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 gear-and-shaft assembly
102 gear
104 shaft
106 external teeth
108 gear body
110 inner-cylindrical surface
112 lead-in surfaces
112*a* chamfer surface
112*b* fillet surface
114 centered-through hole
116 gear-body axial-end faces
118 external spline
120 shoulder
122 shaft axial-end face
124 lead-in surface
124*a* chamfer surface
124*b* fillet surface
126 external teeth
128 flanks
130 top land
132 the fillet roots
134 undeformed sections
136 deformed sections
138 rotor-carrier section
140 bearing-carrier section 200 rotating assembly
202 rotor 204 radial bearing
300 method
310 step
320 step
330 step
340 step
350 step
360 step

What is claimed:

1. A gear-and-shaft assembly comprising:

a gear, the gear including a gear body, the gear body including an inner-cylindrical surface, the inner-cylindrical surface defining a centered-through hole, the gear being a sintered metal; and a shaft, the shaft including an external spline, the external spline including external teeth, the external teeth being aligned parallel to a center axis of the gear-and-shaft assembly, the external teeth including flanks, a top land, and fillet roots, the flanks adjoining between the top land and the fillet roots, a flank angle being an angle between the flanks of adjacent of the external teeth, the flank angle being between 80 degrees and 100 degrees, a root diameter of the external teeth being between 92% and 98% of an outer diameter of the top land, the gear and the shaft being fit together and configured to rotate together about the center axis, the inner-cylindrical surface and the external spline including an interference fit, the top land abutting the inner-cylindrical surface, the interference fit being between the inner-cylindrical surface and the top land, the external spline being softer than the gear, the interference fit deforming the top land and the flanks, the flanks including deformed sections, the deformed sections adjoining the top land.

2. The gear-and-shaft assembly of claim 1, wherein the interference fit is non-disconnectable up to a slip torque, wherein the interference fit is maintained after a torque on the shaft is reduced below the slip torque.

3. The gear-and-shaft assembly of claim 1, wherein the interference fit is one of a locational interference fit, a medium drive fit, or a force fit.

4. The gear-and-shaft assembly of claim 1, wherein the outer diameter of the top land and an inner diameter of the inner-cylindrical surface include an overlap of between 0.5% and 0.7% of the inner diameter of the inner-cylindrical surface.

5. The gear-and-shaft assembly of claim 1, wherein the top land and the deformed sections are deformed radially inwards and circumferentially outwards by the interference fit.

6. The gear-and-shaft assembly of claim 1, wherein the gear is one of a spur gear, a helical gear, a double helical gear, a worm gear.

7. The gear-and-shaft assembly of claim 1, wherein the external teeth are defined in a polar array about the center axis.

8. The gear-and-shaft assembly of claim 1, wherein the top land abuts the inner-cylindrical surface for an entirety of an arc length of the top land, wherein the deformed sections do not abut the inner-cylindrical surface, wherein the external teeth are not involute teeth.

9. The gear-and-shaft assembly of claim 1, wherein the flanks include undeformed sections, wherein the deformed sections adjoin the undeformed sections and the top land, wherein the undeformed sections adjoin the deformed sections and the fillet roots, wherein the flank angle is the angle between the undeformed sections of the flanks of adjacent of the external teeth.

10. The gear-and-shaft assembly of claim 1, wherein the fillet roots adjoin between adjacent of the flanks.

11. The gear-and-shaft assembly of claim 1, wherein the root diameter of the external teeth is between 93% and 97% of the outer diameter of the top land.

12. The gear-and-shaft assembly of claim 1, wherein the flank angle is between 85 degrees and 95 degrees.

13. The gear-and-shaft assembly of claim 1, wherein the inner-cylindrical surface does not include an internal spline, wherein the gear is not deformed by the interference fit.

14. The gear-and-shaft assembly of claim 1, wherein the external spline is carbon steel, wherein the carbon steel is one of a low-carbon steel or a medium-carbon steel, wherein the sintered metal is a hardened-ferrous alloy.

15. The gear-and-shaft assembly of claim 1, wherein the gear body includes a first lead-in surface, wherein the first lead-in surface adjoins to the inner-cylindrical surface, wherein the shaft includes a second lead-in surface, wherein the second lead-in surface adjoins to the external spline, wherein at least one of the first lead-in surface or the second lead-in surface include a chamfer surface, wherein an angle of the chamfer surface is between 10 and 30 degrees.

16. The gear-and-shaft assembly of claim 1, wherein the shaft includes a shoulder, wherein the gear is radially aligned with, axially offset from, and abuts the shoulder, wherein the shaft includes a rotor-carrier section and a bearing-carrier section, wherein the shoulder is disposed axially between the rotor-carrier section and the external spline, wherein the rotor-carrier section is disposed axially between the shoulder and the bearing-carrier section, wherein the rotor-carrier section is disposed radially outwards of the shoulder and the bearing-carrier section.

17. A rotating assembly comprising:
- a gear-and-shaft assembly comprising:
  - a gear, the gear including a gear body, the gear body including an inner-cylindrical surface, the inner-cylindrical surface defining a centered-through hole, the gear being a sintered metal; and
  - a shaft, the shaft including an external spline, the external spline including external teeth, the external teeth being aligned parallel to a center axis of the gear-and-shaft assembly, the external teeth including flanks, a top land, and fillet roots, the flanks adjoining between the top land and the fillet roots, a flank angle being an angle between the flanks of adjacent of the external teeth, the flank angle being between 80 degrees and 100 degrees, a root diameter of the external teeth being between 92% and 98% of an outer diameter of the top land, the gear and the shaft being fit together and configured to rotate together about the center axis, the inner-cylindrical surface and the external spline including an interference fit, the top land abutting the inner-cylindrical surface, the interference fit being between the inner-cylindrical surface and the top land, the external spline being softer than the gear, the interference fit deforming the top land and the flanks, the flanks including deformed sections, the deformed sections adjoining the top land;
- a rotor; and
- a radial bearing, the shaft adjoining between the gear, the rotor, and the radial bearing.

18. The rotating assembly of claim 17, wherein the shaft includes a shoulder, wherein the gear is radially aligned with, axially offset from, and abuts the shoulder, wherein the shaft includes a rotor-carrier section and a bearing-carrier section, wherein the shoulder is disposed axially between the rotor-carrier section and the external spline, wherein the rotor-carrier section is disposed axially between the shoulder and the bearing-carrier section, wherein the rotor-carrier section is disposed radially outwards of the shoulder and the bearing-carrier section, wherein the rotor is adjoined to the rotor-carrier section, wherein the radial bearing is adjoined to the bearing-carrier section.

19. A method comprising:
- forming a gear, the gear including a gear body, the gear body including an inner-cylindrical surface, the inner-cylindrical surface defining a centered-through hole, the gear being a sintered metal;
- forming an external spline in a shaft, the external spline including external teeth, the external teeth being aligned parallel to a center axis of a gear-and-shaft assembly, the external teeth including flanks, a top land, and fillet roots, the flanks adjoining between the top land and the fillet roots, a flank angle being an angle between the flanks of adjacent of the external teeth, the flank angle being between 80 degrees and 100 degrees, a root diameter of the external teeth being between 92% and 98% of an outer diameter of the top land; and
- pressing the gear onto the external spline, the gear and the shaft being fit together and configured to rotate together about the center axis, the inner-cylindrical surface and the external spline including an interference fit, the top land abutting the inner-cylindrical surface, the interference fit being between the inner-cylindrical surface and the top land, the external spline being softer than the gear, the interference fit deforming the top land and the flanks, the flanks including deformed sections, the deformed sections adjoining the top land.

20. The method of claim 19, comprising:
- rotating the gear and the shaft about the center axis of the gear-and-shaft assembly by a torque applied to the shaft, wherein the torque applied to the shaft is up to a slip torque of the interference fit;
- slipping the shaft relative to the gear by the torque applied to the shaft being at or above the slip torque of the interference fit; and
- reducing the torque applied to the shaft below the slip torque such that the gear and the shaft rotate together about the center axis of the gear-and-shaft assembly.

* * * * *